United States Patent Office 3,832,200
Patented Aug. 27, 1974

3,832,200
METHOD FOR THE PREPARATION OF BITUMINOUS PAVING COMPOSITIONS AND COMPOSITIONS OBTAINED THEREBY
Michel Kennel, Le Havre, and Joseph Quiquerez, Sainte-Adresse, France, assignors to Societe Anonyme dite Compagnie Francise de Raffinage, Paris, France
Continuation-in-part of abandoned application Ser. No. 98,974, Dec. 17, 1970. This application June 14, 1972, Ser. No. 262,542
Claims priority, application France, Dec. 17, 1969, 6943680; June 15, 1971, 7121713
Int. Cl. C08h *13/00, 17/02*
U.S. Cl. 106—281 R          5 Claims

ABSTRACT OF THE DISCLOSURE

Bituminous paving compositions comprising a dry mineral aggregate, a dry filler, a preheated bituminous binder and hard asphalts in the form of a non-preheated powder are prepared by mixing said components in any order at a temperature in the range of about 140° C. to about 210° C., preferably 180° to 205° C. The hard asphalts preferably contain at least 40% by weight of hard asphaltenes and no more than 30% by weight of carboids. The hard asphalts may be precipitated around particles of filler by adding normal hexane to a suspension of the filler in a benzene solution of asphalts.

---

This application is a continuation-in-part application of U.S. Ser. No. 98,974 filed Dec. 17, 1970, now abandoned.

This invention relates to a method for the preparation of bituminous paving compositions having improved mechanical properties: It also relates to superior bituminous paving compositions prepared by this method.

Bituminous paving compositions comprise an aggregate, a bituminous binder and a filler. The aggregate is composed of the granular materials which are retained by screens of French Standard AFNOR 20 but are not retained by screens in the range AFNOR 21 through 42. The bituminous binder used for the manufacture of paving compositions comes from coal or petroleum; it is composed of asphaltenes, malthenes and resins which are products of more or less polar intermediate character. The filler is composed of particles whose diameter is less than 80 microns and which consequently pass through the AFNOR 20 mesh screen.

In the description and the claims which follow, the term "hard asphalts" denotes substances high in hard asphaltenes and refers to products containing at least 40% by weight of hard asphaltenes such as are manufactured on a large-scale from a variety of raw materials including crude oil distillation residues, propane deasphalting tars, and residues enriched with synthetic asphaltenes by oxidation with air or sulfur. By "asphaltenes" we mean products soluble in carbon disulfide precipitated in the cold or separated with the aid of heat from bituminous materials containing them, by means of saturated low-boiling hydrocarbons, more particularly pentanes, hexanes, heptanes or mixtures thereof. The material which is insoluble in normal heptane as determined in accordance with standard I.P. 143/57 is denoted by the term "hard asphaltenes." The fractions from the range of products having the lowest molecular weights which can be precipitated or separated by pentanes but not by normal-heptane are referred to as "resins." The molecular weight of the hard asphaltenes (Mn) determined by vapor pressure osmometry is higher than 2000. The other asphaltenes have a lower molecular weight (Mn) lying between 700 and approximately 2000; they can be separated by saturated hydrocarbons boiling lower than normal-heptane, but also by polar solvents such as butanol, isopropanol, ethyl ether, etc.

The softening point for "hard asphalts" thus defined varies within fairly broad limits depending upon the proportion of "hard asphaltenes" to resins; it can be defined as the temperature at which the particles cling together and can be measured for example on a heated metal block (Maquenne block). The softening point can vary between 120 and 200° C. and even more as the hard asphaltene content varies from 40 to 80%.

The use of very hard binders have been suggested for inproving certain mechanical properties of paving compositions. However the use of very hard binders does not necessarily improve the whole of the mechanical properties of the paving compositions. Moreover the harder the binder, the more heat is required in the preparation of the paving compositions.

It is also known that molded objects such as bricks, tiles, slabs, sheets and piping can be made by addition of an aggregate with filler to a mixture of oil and asphaltenes. British Pat. 1,127,847 relates to the preparation of such articles. The composition giving the mixture the best crushing strength is one wherein the ratio of oil to asphaltenes by weight is equal to 20/80; and wherein the ratio of filler to aggregate is 20 parts by weight of filler to 80 parts by weight of aggregate. Lowering of the filler content has detrimental effects. It must be noted that the oil used in British Pat. 1,127,847 is only a diluent and not a standard bituminous binder, such as is used in the present invention, in that it has an appreciably lower asphaltene content. Moreover the low oil and the high filler contents make the compositions described in the aforesaid patent unsuitable for roadmaking.

Numerous patents are known whose object is the preparation of bituminous paving compositions at ordinary or rather low temperatures. But all of them have many obvious disadvantages in practice, particularly in roadmaking. U.S. Pats. 1,940,645; 2,220,670 and 3,074,807 are three examples thereof. U.S. Pat. 1,940,645 relates to a bituminous paving composition whose binder is prepared by mixing three components: a preferably volatile diluent, a conventional binder and a liquid or powdered asphalt which can be a blown asphalt or a very hard asphalt such as Gilsonite. This process is not in general use, since it requires evaporation of the diluent at ordinary temperatures and cannot therefore be used to make paving compositions in special demand in modern road building engineering; furthermore, the mixing of the constituents of the paving composition at ordinary temperatures does not lead to a satisfactory dispersion of the asphaltenes in the binder and the optimization of performance characteristics. U.S. Pat. 2,220,670 relates to a bituminous paving composition prepared by mixing an aggregate coated with a substantially non-volatile highly aromatic, non-paraffinic oil which is fluid at normal temperature with a powdered bituminous binder which is not a hard asphalt powder; the mixing is done at normal temperature and the oil is a liquid fluxing oil and not a conventional binder. U.S. Pat. 3,074,807 relates to a two stage process of making a bituminous paving composition consisting of an aggregate coated with a bituminous binder, liquid at ambient temperature, and a powdered natural asphaltite. In a first stage these components are mixed at a temperature lower than the critical amalgamation temperature of the natural asphaltite to the binder, i.e. less than about 100° F., whilst the bituminous binder used has a relatively high portion of volatile components; in the second stage the composition is amalgamated either by the application of pressure or by subjecting it to high temperatures for prolonged periods.

U.S. Pat. 2,349,446 relates to a process of making bituminous paving compositions which consists in preparing a first batch portion by mixing coarse aggregate particles with bituminous cement in liquid form, and a second batch portion by mixing fine aggregate particles with fluxing oil and with powdered hard bitumen and thereafter bringing the two batches together and mixing them; this process requires two different binders: one in each batch; the binder used in the second batch is a diluent rather than a conventional binder, and the temperature of mixing the two batches together is too low to assure a sufficient degree of amalgamation of the composition.

The use of a diluent is not without drawbacks. It demands very high proportions of asphaltenes which are generally expensive. As it will be seen hereinafter, the bituminous paving compositions prepared according to the process of the invention have improved mechanical properties and a better stability without overdosing them with asphaltenes.

The mechanical properties of the paving compositions can very between relatively wide limits depending on the nature of the binder (viscosity, modulus of rigidity, chemical stability at the paving temperature): for instance the resistance measured at 18° C. by the LCPC method for bitumens having the same penetration of 80/100 can vary between 40 and 80 bars. Depending on the temperature susceptibility of the binders used, the relative differences in properties of the paving compositions may vary or even become reversed, if the comparisons are made at temperatures higher or lower than 18° C.

The properties of the binder as a function of temperature are not however the only factors which determine the resistance of a paving composition. The quantity of the filler is also important. A number of materials can serve as filler: sand, limestone, slags, lime, vulcanized rubber, ground and screened coke obtained by any known method from coal or oil; a mixture of fillers can also be used.

As Tunnicliff teaches (Proceedings Association of Asphalt Paving Technologists, vol. 36, pages 114–156) the resistance of bituminous paving compositions is essentially determined by:

(a) modulus of rigidity of the mastic (binder+filler) which is a function of the modulus of rigidity of the binder itself and its fillerization value (ratio of filler/binder);

(b) relative volume of the remaining voids in the paving composition expressed by the void coefficient as $$\frac{\text{Percent volume of binder} + \text{percent volume of filler}}{\text{Percent volume of voids in the aggregate without filler.}}$$

As will be evident later from the description of our invention, however, we have found that it is possible to produce paving compositions having the same void coefficient but with widely different and superior resistance properties.

An object of the present invention is to provide superior bituminous paving compositions and a method whereby they can be prepared.

According to the invention superior bituminous paving compositions comprising a mineral aggregate, a bituminous binder and a filler, are prepared by the addition of hard asphalts during the preparation of the composition, the mixing temperature being equal to at least 140° C. and the components being mixed in any order.

The present invention furthermore provides a method for preparing superior bituminous paving compositions comprising an aggregate, a bituminous binder and a filler, by precipitating the hard asphalts around the filler before the latter is blended with the aggregate and the preheated binder.

It has now been ascertained that certain tests are good indicators of the subsequent behavior of the paving compositions under working conditions. Specifically the tests comprise fatigue strength, compressive or tensile strength and resistance to rutting.

These tests, hereinafter to be described in detail within the scope of working examples of the invention, consist in the case of the first test: applying a constant force of rotary flexion to a test piece at a constant frequency; in the case of the second test: imposing an axial stress of compression or elongation on a test piece to produce a linear distortion; and in the case of the third test: subjecting a slab of the paving composition to the periodic passage of an inflated pneumatic tire under constant load and frequency.

We have found that superior paving compositions can be prepared by regulating the ratio between the volume of the hard asphalts and that of filler in such a manner as to optimize the desired properties of the composition for the specific purpose for which it is intended. It has been found in this connection that the ratio $$\frac{\text{volume hard asphalts} + \text{filler}}{\text{volume hard asphalts}}$$

has an optimum value for each temperature range for a given binder and aggregate which provides maximum life in the rotative flexion test under steady load and frequency.

The hard asphalts usable within the scope of this invention must be in a sufficiently divided form so that their introduction into the paving composition will not involve any heterogeneity of composition in the binder. A hard asphalt particle size of the same order of magnitude as that of the filler has been found to be particularly advantageous for the method of this invention. However, such size is not a critical one and it will be sufficient if the hard asphalts used come in the form of particles whose size does not exceed that of the finest portion of the aggregate. The finer the hard asphalts, the more quickly their homogeneous dispersion in the binder upon mixing.

Certain raw materials such as those obtained from cracking, visbreaking, hydrocracking residues and pyrolysis of oxidized or polymerized residues can contain carboids. Because of their low hydrogen content, carboids are insoluble in carbon disulfide; they are also precipitated by low boiling saturated hydrocarbons. Carboids have a softening temperature higher than the hard asphaltenes and can even be practically infusible. The term "hard asphalts" also covers products containing carboids but it has been found that in the manufacture of superior paving compositions of this invention, the action of the carboids is less effective than that of the hard asphaltenes. The amount of carboids in the hard asphalts should preferably be less than 30% by weight.

Natural asphalts can also be used as hard asphalts after they have been ground to a powder.

The bituminous binder used comes from coal or oil; it is obtained by generally known processes.

The invention makes it possible to prepare superior bituminous paving compositions from relatively soft binders (with a penetration of 80/1100 for example); the mechanical properties of such compositions are superior to those obtained for paving compositions prepared, by conventional methods, from harder binders (of 20/30 penetration, for example).

The possibility to use soft rather than hard binders has many obvious advantages. For instance, soft binders are more readily stored, handled and transported than the more viscous hard binders. They are also easier to apply. Further, they make possible savings in the heat required in preparing the paving compositions, since soft binders are workable at lower temperatures than hard binders.

One unexpected finding is that despite their different natures, to a very large extent, the filler can advantageously be replaced by hard asphalt; this substitution yields bituminous paving compositions of far superior performance characteristics.

It has also been found that in order to obtain optimum fatigue properties, the filler and hard asphalt proportions to be added when preparing composition must not be taken at random; the optimum proportion depends on the mean service temperature for the pavement. Thus, for example, if two compositions are considered, one of which for a mean service temperature of 20° C. and the other for 5° C., the ratios between the quantity in terms of volume of hard asphalts introduced into the coating and the sum of the volumes of hard asphalts plus fillers, which correspond to the optimal fatigue properties are 0.5 and 0.25 respectively. The present invention allows determination of the optimum proportions mentioned above by carrying out rotative flexion tests at steady load and frequency on test pieces of bituminous paving compositions of various formulations. The invention lends itself, consequently, to the manufacture from a binder of given hardness, of paving compositions with better mechanical properties for the range of temperatures for which the composition is intended.

The mixing temperature of the ingredients assumes considerable importance and produces an unexpected effect: in fact, while the mixing temperature has in practice only a slight influence on the mechanical properties of paving compositions made by conventional methods, it has, on the contrary, a great effect on the quality of the paving compositions made according to the present invention (this result will be illustrated by Example V). In practice, it is found advantageous to carry out the mixing step at temperatures higher than those used with conventional formulations in order to assure a good dispersion of hard asphalts in the hydrocarbon binder. The mixing temperature must be at least 140° C.; nevertheless, it is not worth while proceeding to mix at temperatures higher than 210° C., since in the first place, the gain in mechanical strength is low, and secondly, the hard asphalts as well as the binder are liable to become deteriorated at such high temperatures. We have found that for most paraffinicasphaltic crudes, such as those of the Middle East, the preferred range is between 180 and 205° C. It has also been found that the mixing temperature must increase when the softening point of the hard asphalts rises and that, for a given softening point, finer particles allow a relative lowering of such temperature.

The hard asphalts can be introduced into the mixture of binder, aggregate and filler at the end of the mixing operation; in this way the advantage of working with a soft binder as long as possible is maintained. Nevertheless, the addition of the hard asphalts only at the end of the mixing operation is not imperative; they can be added at any stage during the production of the paving composition: thus hard asphalts can be introduced into the binder before its conveyance to the paving sites.

One method of introducing hard asphalts is to precipitate the hard asphalts around the filler by addition, for example, of normal hexane to a suspension of filler in a solution of asphalts in benzene, then adding the filler and hard asphalts to the mixture of aggregate and binder.

Eight figures are attached to the specification.

Figure 1:
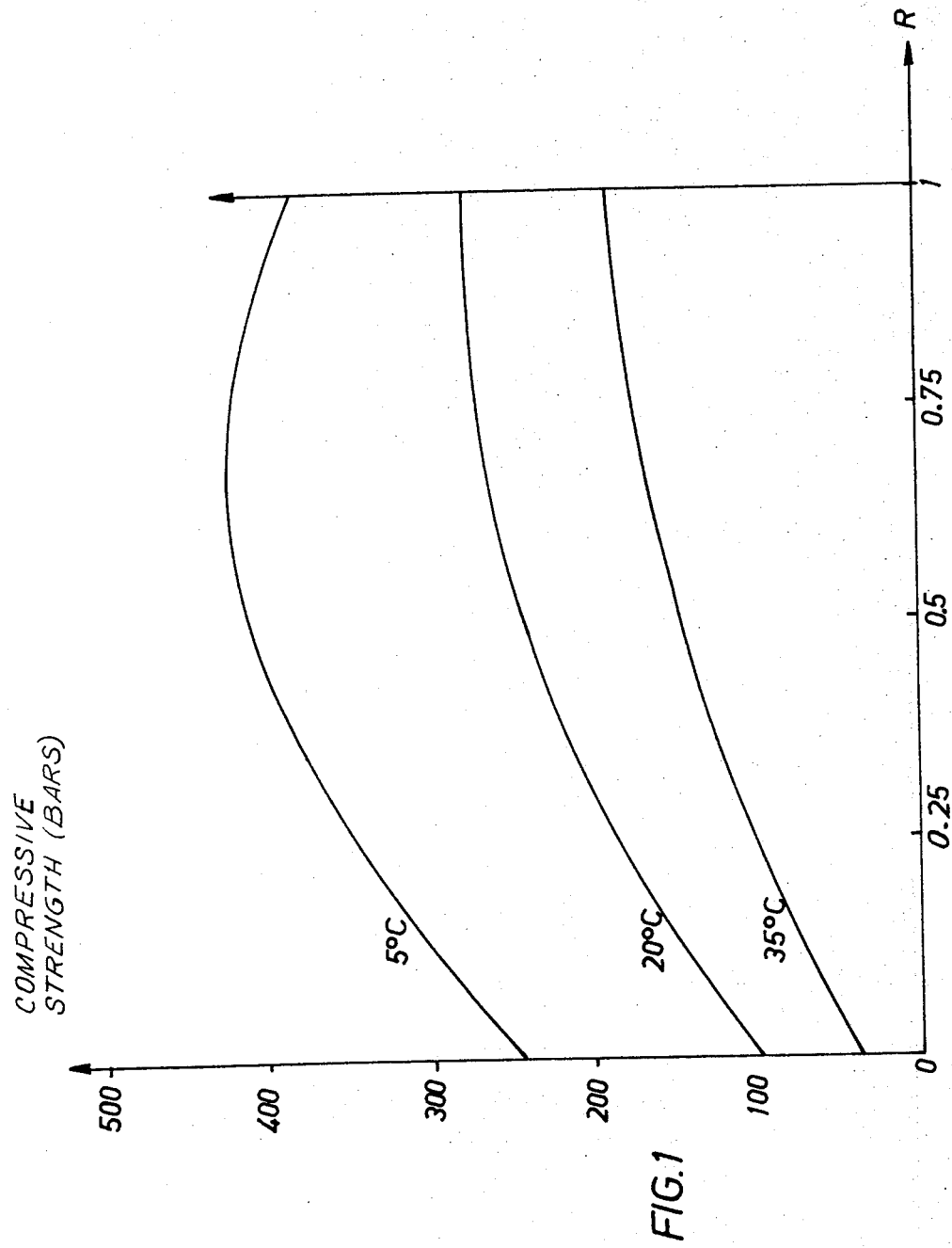
FIGS. 1, 2 and 3 are graphic representations of the results obtained in Example III; they relate respectively to the compressive strength and fatigue life measured as a function of R (whereof the definition is given in Table III) and the compressive strength measured as a function of temperature.

The invention is further illustrated by the following examples which are mentioned nonlimitatively.

EXAMPLE I

The binder used in all of the following tests had a penetration of $80/100$, expressed in tenths of a millimeter (test effected at 25° C., with a 100 gram load applied for 5 seconds, the needle conforming to French Technical Standard N.F.T. 6004). The binder used in Examples I, II and III, is obtained by direct distillation of a Boscan type crude oil of Venezuelan origin.

The hard asphalts result from normal-heptane precipitation of a deasphalting pitch; they are wholly soluble in benzene and in carbon disulfide. They are used in the form of a powder having a particle size less than approximately 80 microns.

The filler is a sand filler obtained by screening sand, or a limestone filler, or an oil coke filler obtained by the fluid coking process, whose properties are as follows:

Infusible
Wholly insoluble in carbon disulfide
Composition:

|  | percent by weight |
|---|---|
| Carbon | 87.25 |
| Hydrogen | 2.30 |
| Oxygen | 4.4 |
| Ash | 0.14 |
| Sulfur | 5.91 |

$$\text{Ratio } \frac{\text{Carbon by weight}}{\text{Hydrogen by weight}} = 38$$

$$\text{Ratio } \frac{\text{Hydrogen in gram-atoms}}{\text{Carbon in gram-atoms}} = 0.31$$

A bituminous paving composition was produced by the following method: sand 0/3 previously screened, (screening is effected if it is not wished to introduce sand filler or if it is to be introduced in proportions differing from the natural proportions), was oven dried at 150° C. The $80/100$ penetration binder was preheated to the same temperature over a period of 2 hours. The sand was introduced into a temperature-controlled mixer. The cold filler was then dispersed into the sand for 5 minutes as necessary. Then the cold, hard asphalts were introduced. The binder was then added; mixing in the presence of the binder proceeded for 5 minutes, at the end of which time the test pieces were prepared.

For the fatigue strength tests, toroidal test pieces were made having a middle diameter of 30 mm. and end diameters of 45 mm. These toroidal test pieces are made as follows: a volume of 200 cc. of paving composition is introduced into a cold mold and immediately compressed under 15 metric tons pressure by means of two pistons for 30 seconds. After cooling, the test pieces are taken out of the mold and then remain for a sufficient period to allow them to reach thermal equilibrium at the fatigue test temperature.

Cylindrical test pieces, having a diameter of 45 mm. and weight of 300 grams, are made for the compression strength tests; they are compacted under 6 metric tons for 1 minute. The same precautions are observed for stripping from molds and storage as those already stated above.

The fatigue strength tests consist in imposing on the toroidal test piece, under steady load and temperature, torsion at a frequency of 25 cycles per second. The toroidal test piece is placed in such a way that its axis will be vertical when no load is exerted thereon; the bottom of the test piece is engaged in a mandrel which, at the time of the test, is driven in rotary motion around its vertical axis; the speed of rotation is adjustable. Around the top of the test piece, a metal rim is placed, around which a ball bearing is engaged. This device allows a steady transverse tensile stress to be applied to the test piece. The number of cycles made by the test piece at the instant when breakage takes place is noted, which hereinafter will be called the fatigue life.

The compression strength tests consist in submitting the cylindrical test piece to a crushing force at the steady speed of 50 mm. per minute. The force exerted at the moment when the test piece breaks is noted.

Table I below shows the composition of the various test pieces, together with fatigue life and compressive strength corresponding to each of these compositions; determination of these properties was effected at 20° C. Compositions in aggregate, filler and hard asphalts are given in percentage per 100 parts by volume of aggregate, filler and hard asphalts; the proportion of binder is given for 100 parts by weight of aggregate, filler and hard asphalts.

Melting point _____° C.___ 280
Insolubles in carbon disulfide, percent (by weight) _____ 25

Composition: Percent (by weight)
  Carbon _____ 82.89
  Hydrogen _____ 6.5
  Oxygen _____ 1.3
  Ash _____ 0.88
  Sulfur _____ 8.43

$$\text{Ratio} \frac{\text{Carbon (by weight)}}{\text{Hydrogen (by weight)}} = 12.7$$

$$\text{Ratio} \frac{\text{Hydrogen (in gram-atoms)}}{\text{Carbon (in gram-atoms)}} = 0.94$$

TABLE I

| Test number | 1 | 2 | 3 | 4 | 5 |
|---|---|---|---|---|---|
| Composition (volume) percent: | | | | | |
|   0/3 sand freed of filler | 84 | 84 | 84 | 84 | 84 |
|   Sand filler | 16 | | | | |
|   Limestone filler | | 16 | | | |
|   Oil coke filler | | | 16 | 14 | 8 |
|   Hard asphalts | | | | 2 | 8 |
| Binders (parts by weight) | 8 | 8 | 8 | 8 | 8 |
| Void coefficient | 0.88 | 0.88 | 0.88 | 0.88 | 0.88 |
| Mechanical properties at 20° C.: | | | | | |
|   Fatigue life: | | | | | |
|     Under 7.7 bars (No. of cycles) | $5.5 \times 10^5$ | $1.2 \times 10^5$ | $1.5 \times 10^5$ | $3 \times 10^6$ | $>10^7$ |
|     Under 17 bars (No. of cycles) | $6.0 \times 10^3$ | $2.5 \times 10^3$ | $3.5 \times 10^3$ | $1.2 \times 10^4$ | $7.5 \times 10^4$ |
|   Compressive strength (bars) | 110 | 100 | 100 | 160 | 240 |

The mechanical properties of compositions 1, 2 and 3 were essentially the same. Fillers of different character, when present in the paving compositions in identical volumes therefore furnish the latter with closely related mechanical properties.

Tests 4 and 5 illustrate the properties of the paving compositions obtained by using the method of the invention. A comparison between the various mechanical properties of these paving compositions and No. 3 shows the considerable increase in fatigue life and compressive strength furnished by application of the invention method. These advantageous results are also found to be obtained by lowering the filler proportion in the paving composition.

EXAMPLE II

This example relates to the application of the invention method in the case where the hard asphalts introduced into the paving composition are not entirely soluble in carbon disulfide.

Bituminous paving compositions were prepared according to the method described in Example I, except that the hard asphalts used were obtained by precipitation from a visbreaking fuel with a straight-run gasoline between 60° C. and 100° C. Visbreaking was effected on a vacuum distillation residue of an Iraki crude oil. This produced a fuel having a viscosity of 280 cs. at 50° C. and a xylene equivalent equal to 95.

The precipitate of hard asphalts had the following characteristics:

The hard asphalts were obtained directly in a sufficiently finely divided form for introducing into the paving composition without grinding or screening.

Table II below presents the formulation as well as the mechanical properties of the paving compositions, measured at 20° C. under conditions identical to those described in Example I.

TABLE II

| Test number | 1 | 7 |
|---|---|---|
| Composition (volume) percent: | | |
|   0/3 sand freed of filler | 84 | 84 |
|   Sand filler | 16 | 8 |
|   Hard asphalts | | 8 |
| Binder (parts by weight) | 8 | 8 |
| Void coefficient | 0.88 | 0.88 |
| Mechanical properties at 20° C.: | | |
|   Fatigue life: | | |
|     Under 7.7 bars (No. of cycles) | $5.5 \times 10^5$ | $1 \times 10^7$ |
|     Under 17 bars (No. of cycles) | $6.0 \times 10^3$ | $1.5 \times 10^5$ |
|   Compressive strength (bars) | 110 | 275 |

It is established that the introduction of hard asphalts and the concomitant decrease of the proportion of filler in the bituminous paving composition considerably improve the latter's mechanical properties.

EXAMPLE III

This example relates to the effect of temperature on the mechanical properties of the paving compositions and the determination of the optimal proportion of hard asphalts and filler suitable for introduction in a paving composition.

The paving compositions used in the tests contained a coke filler identical to the one described in Example I.

The hard asphalts used, which were wholly soluble in carbon disulfied, were identical with those used in Example I.

The method of preparing the test pieces and also the determinations of the mechanical properties were described in Example I.

Table III shows the formulation of the various paving compositions tested together with their mechanical properties at various temperatures. For the fatigue life test, the value of the load used, which was constant for each temperature, was the one inducing breakage at 3,500 cycles for the composition not containing hard asphalts, namely for 35° C., 20° C. and 5° C., 7.7, 17 and 42 bars, respectively.

is made of the curves giving the variation of the fatigue life as a function of the ratio R, together with curves giving the compressive strength.

Values of the ratio R will preferably be selected which lead to a maximum of the fatigue life in the case where the paving composition is intended for the making of road pavements. On the other hand, values of this ratio affording high compressive strength will be selected in the case where the composition is used in the making of mo'ded blocks for the construction of buildings, for example. Values of the ratio R slightly higher than the

TABLE III

| Test number | 8 | 9 | 10 | 11 | 12 | 13 | 14 | 15 | 16 | 17 | 18 | 19 |
|---|---|---|---|---|---|---|---|---|---|---|---|---|
| Composition (volume) percent: | | | | | | | | | | | | |
| 0/3 Sand freed of filler | 84 | 84 | 84 | 84 | 84 | 84 | 84 | 84 | 84 | 84 | 84 | 84 |
| Coke filler | 16 | 12 | 8 | 4 | 2 | 16 | 12 | 8 | 4 | 16 | 12 | 8 |
| Hard asphalts | | 4 | 8 | 12 | 14 | | 4 | 8 | 12 | | 4 | 8 |
| Binder (parts by wt.) | 8 | 8 | 8 | 8 | 8 | 8 | 8 | 8 | 8 | 8 | 8 | 8 |
| $R = \dfrac{\text{Hard asphalts vol.}}{\text{Hard asphalts vol. Plus filler volume}}$ | 0 | 0.25 | 0.50 | 0.75 | 0.87 | 0 | 0.25 | 0.50 | 0.75 | 0 | 0.25 | 0.50 |
| Void coefficient | 0.88 | 0.88 | 0.88 | 0.88 | 0.88 | 0.88 | 0.88 | 0.88 | 0.88 | 0.88 | 0.88 | 0.88 |
| Mechanical properties at the temperature of | 35° C. | 35° C. | 35° C. | 35° C. | 35° C. | 20° C. | 20° C. | 20° C. | 20° C. | 5° C. | 5° C. | 5° C. |
| Compressive strength (bars) | 45 | 105 | 150 | 165 | 180 | 100 | 190 | 240 | 260 | 240 | 350 | 400 |
| Fatigue life (no. of cycles) | $3.5\times10^3$ | $1.6\times10^5$ | $8\times10^5$ | $1.1\times10^6$ | $7\times10^5$ | $3.5\times10^3$ | $3\times10^4$ | $7.5\times10^4$ | $3\times10^4$ | $3.5\times10^3$ | $9\times10^3$ | $3.5\times10^3$ |
| Under load (bars) | 7.7 | 7.7 | 7.7 | 7.7 | 7.7 | 17 | 17 | 17 | 17 | 42 | 42 | 42 |

Figure 2:
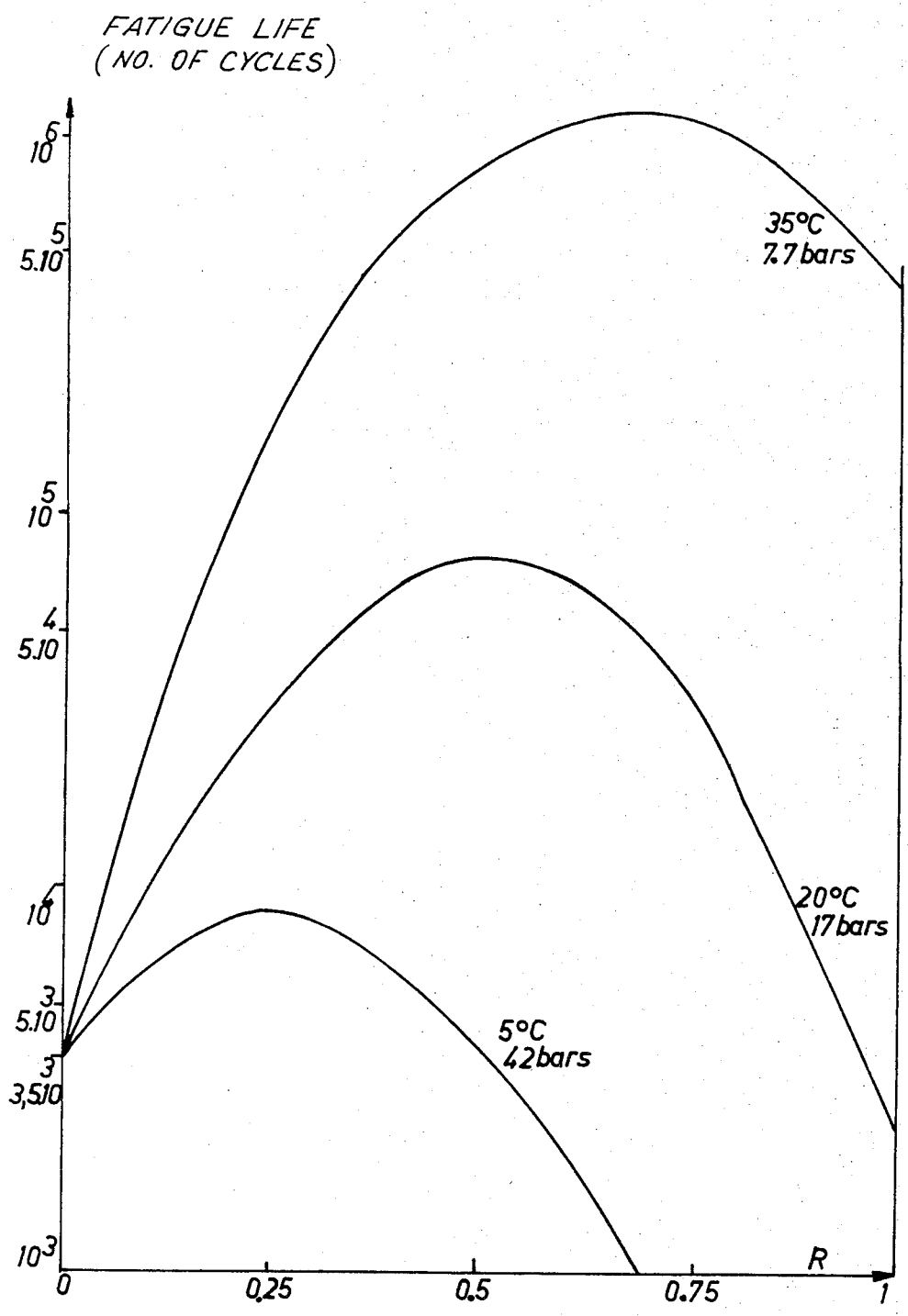
Figure 3:
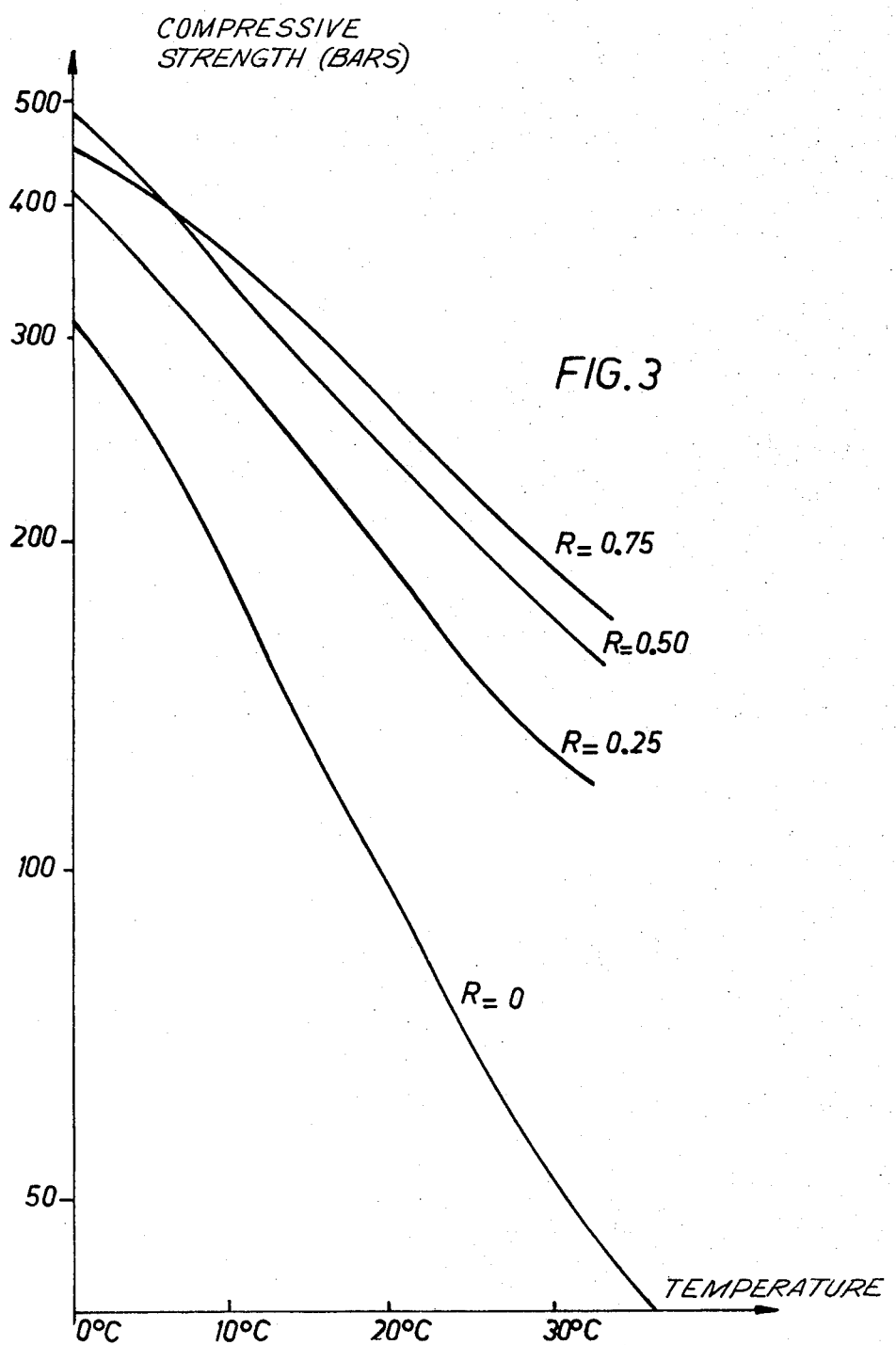

FIGS. 1, 2 and 3 are graphic representations of the results obtained.

FIG. 1 is a diagram of the representative curves of the variation of compressive strength (expressed in bars) as a function of the value R of the ratio of the volume of hard asphalts introduced, divided by the sum of the volumes of hard asphalts and filler introduced. It will be noticed that this sum is constant, since the addition of hard asphalts is made at the expense of the amount of filler.

FIG. 2 is a diagram of the representative curves of the variation of fatigue life as a function of the value R of the ratio defined in connection with FIG. 1. The fatigue life of the test pieces is expressed by the number of cycles effected before breakage, at constant frequency and under a constant load for each test temperature.

FIG. 3 represents a set of curves illustrating the variation of the compressive strength (expressed in bars) in terms of the service temperature of the paving composition.

It can be noted that the compressive strength is an increasing function of the hard asphalt proportions introduced at the expense of the filler in the paving composition, except at the temperature of 5° C. for which there is a maximum breaking load. On the other hand, the fatigue life passes through a maximum when the proportion of hard asphalts increases in the paving composition. The position of this maximum varies with temperature. Thus, paving compositions used at mean temperatures of 5° C., 20° C. and 35° C. have a fatigue life for the value R of the ratio of the volume of hard asphalts to the sum of the volumes of hard asphalts and filler of approximately 0.25, 0.50, 0.75, respectively.

It is therefore possible, knowing the range of temperatures to which the bituminous paving composition will be subjected during its service, to determine the value of the ratio R which will give the paving composition the highest mechanical properties and to deduce therefrom the amount of filler and hard asphalts suitable to introduce into the paving composition. In order to do this, use values corresponding to the maxima of the fatigue life at a given temperature, constitute a satisfactory compromise between the requirements of fatigue life and resistance to compression and to creep.

EXAMPLE IV

This example relates to formulations for bituminous paving compositions for use in the making of road pavements. These compositions were subjected to the crushing strength test by the test method recommended by the French Highways and Bridges Central Laboratory (LCPC Strength, or Duriez Test). Tests were effected for two different binders: the first was a binder of 80/100 penetration arising from the dilution of a blown vacuum distillation residue from crude Iraki petroleum with the nonblown residue; the second, much more fluid, was a vacuum distillation residue of Iraki crude oil whose viscosity amounted to 900 cs. at 210° F. or 99° C.

The method of test piece preparation was as follows: the binder brought either to a temperature of 150° C. when dealing with a 80/100 penetration binder or of 120° C. when handling the vacuum distillation residue was added to the aggregate previously dried at 140° C. After about 15 seconds of mixing, the coke filler, preheated in advance to 140° C. was added; then after approximately 15 seconds, the unpreheated hard asphalts, identical with those described in Example I, were added. After a total mixing time of about 2 minutes, a test piece complying with the standards set by the French Highways and Bridges Central (LCPC) Testhouse was prepared and subjected to the crushing strength test at 18° C.(LCPC crushing strength).

Table IV sets out the formulation of the bituminous paving compositions and their crushing strength at 18° C. The amounts of aggregate, filler and hard asphalts are given as percentages per 100 parts by volume of these three constituents; the proportion of binder is given per 100 parts by weight of these three constituents. The sizes of the constituents of the aggregate are given in millimeters.

TABLE IV

| Test number | 20 | 21 | 22 | 23 | 24 | 25 | 26 | 27 | 28 | 29 |
|---|---|---|---|---|---|---|---|---|---|---|
| Composition (volume) percent: | | | | | | | | | | |
| 0/3 sand freed of filler | 37.1 | 37.1 | 27.1 | 37.1 | 37.1 | 37.1 | 37.1 | 37.1 | 27.1 | 37.1 |
| Gravel 3/5 | 18.5 | 18.5 | 18.5 | 18.5 | 18.5 | 18.5 | 18.5 | 18.5 | 18.5 | 18.5 |
| Gravel 5/8 | 18.5 | 18.5 | 18.5 | 18.5 | 18.5 | 18.5 | 18.5 | 18.5 | 18.5 | 18.5 |
| Gravel 8/12 | 18.5 | 18.5 | 18.5 | 18.5 | 18.5 | 18.5 | 18.5 | 18.5 | 18.5 | 18.5 |
| Coke filler | 5.4 | 5.6 | 3.7 | 1.8 | | 7.4 | 5.6 | 3.7 | 1.8 | |
| Hard asphalts | | 1.8 | 3.7 | 5.6 | 7.4 | | 1.8 | 3.7 | 5.6 | 7.4 |
| Binder: | | | | | | | | | | |
| Bitumen 80/100 (parts by weight) | 6.2 | 6.2 | 6.2 | 6.2 | 6.2 | | | | | |
| Residue under vacuum (parts by weight) | | | | | | 6.2 | 6.2 | 6.2 | 6.2 | 6.2 |
| LCPC crushing strength at 18° C. (kg./cm.²) | 41 | 58 | 75 | 95 | 95 | 22 | 27 | 35 | 47 | 58 |
| Void coefficient | 0.64 | 0.64 | 0.64 | 0.64 | 0.64 | 0.64 | 0.64 | 0.64 | 0.64 | 0.64 |

Figure 4:
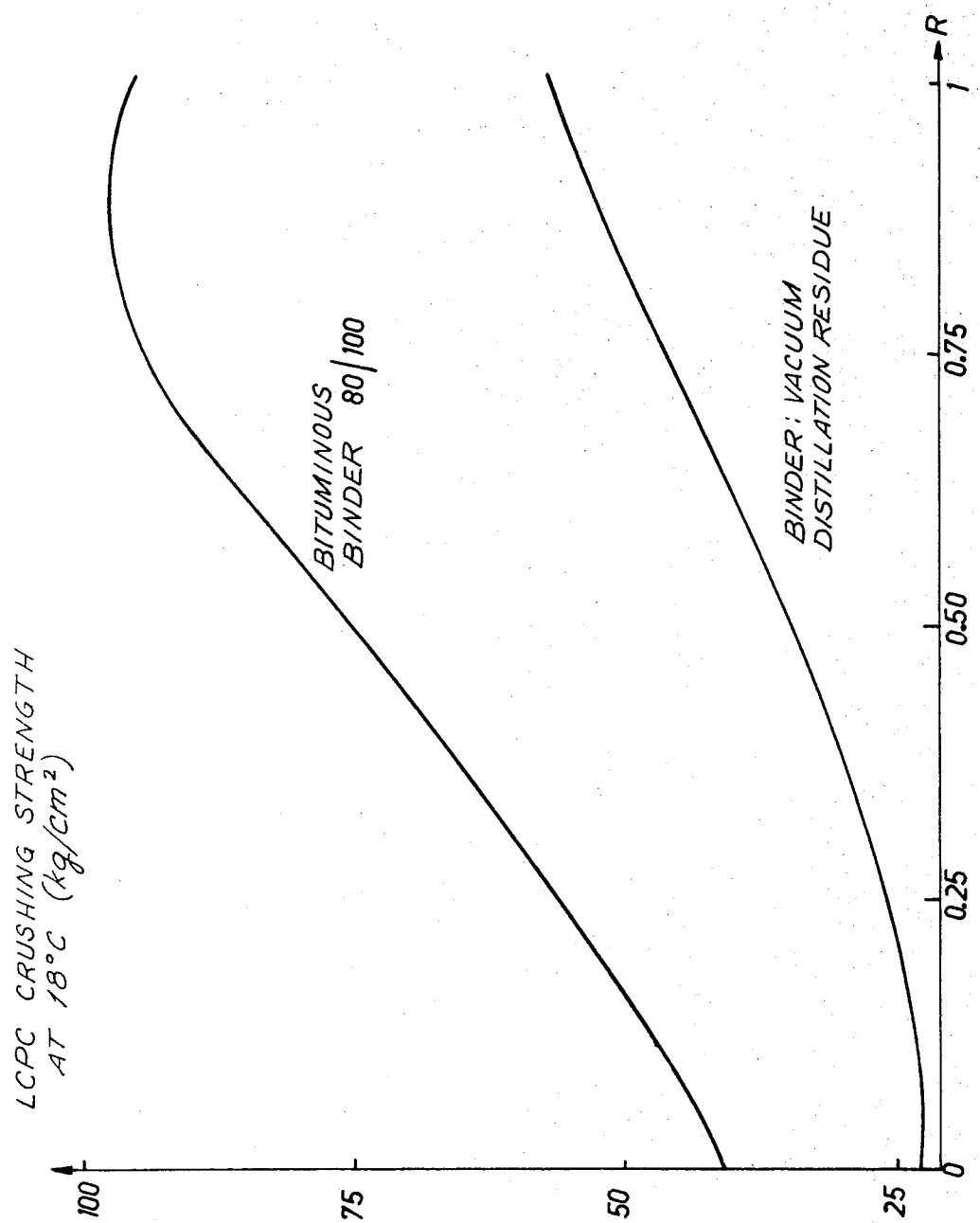
FIG. 4 is a graphic representation of the results of Example IV. It relates to LCPC (French Central Highways and Bridges Laboratory) crushing strength at 18° C. as a function of R.

FIG. 4 is a set of representative curves of the variation of the LCPC crushing strength as a function of the value R of the ratio defined in connection with FIG. 1.

The conclusions to be drawn are analogous to those expounded in Example III. The curve relative to the 80/100 binder is to be compared with the cure relative to the temperature of 20° C. on FIG. 1, although this latter does not shown any maximum. It appears that in the conditions defined above, a coating whose value R of the ratio of the volume of hard asphalts to the sum of volumes of the filler and hard asphalts is in the vicinity of 0.75 and preferably higher, constitutes an excellent road pavement. Doubling of the strength is obtained with the 80/100 binder for a ratio R of the order of 0.57. On the contrary, the curve relative to the binder constituted by a vacuum distillation residue shows that to attain that same level of mechanical performances, a prohibitive consumption of hard asphalts must be allowed. The curve relative to the binder constituted by a vacuum distillation residue is to be compared with the curve relative to the temperature of 35° C. on FIG. 1, the binder being in this case harder: the larger R values are the most favorable.

EXAMPLE V

This example relates to the effect of the mixing temperature of the constituents of bituminous paving compositions.

The binder used in this example, as well as in Examples VI, VII and VIII had a penetration of $80/100$; it was the product from the dilution of a blown vacuum distillation residue from Kuwait crude petroleum with the same non-blown residue.

Three control paving compositions $T_1$, $T_2$, $T_3$ of the same composition (without hard asphalts) were made; the mixing temperatures were $t_1$, $t_2$, $t_3$ respectively. Three paving compositions I, II, III of like composition with hard asphalts were also made; the mixing temperatures were respectively $t_1$, $t_2$, $t_3$.

The method used was as follows: to 6.5 parts by weight of 90 penetration binder kept at the temperature $t_1$ or $t_2$ or $t_3$, 100 parts by weight of the aggregate and filler mixture (previously dried at temperature $t_1$, $t_2$, or $t_3$) were added, being distributed in the following manner: 0/3 sand (33.6% by volume), 3/5 gravel (30% by volume), 5/8 gravel (20% by volume), 8/12 gravel (20% by volume) and sand filler (6.4% by volume) in due course. The hard asphalts were then added in the form of a carefully ground, unpreheated powder. Mixing proceeded for 1 minute at temperature $t_1$ or $t_2$ or $t_3$.

The hard asphalts were obtained by treatment at 20–25° C. of a vacuum distillation residue of a crude Iraki oil with a low-boiling gasoline. After washing to remove oil, the solvent was evaporated from the hard asphalts. A product resulted whose solubility in heptane was less than 25%, whose solubility in benzene was higher than 90%, whose true density was around 1.15 and whose melting point was higher than 145° C. After grinding, microscopic observation disclosed that the major portion of the particles had a diameter less than 20%.

The composition of the paving compositions expressed in parts by weight is shown in Table V. In all of these tests, the void coefficient is about 0.64.

TABLE V

| Paving compositions | Aggregate plus filler | Binder (penetration) | Hard asphalts |
|---|---|---|---|
| I, II, III | 100 | 6.5(90) | 1 |
| $T_1$, $T_2$, $T_3$ | 100 | 6.5(90) | 0 |

Slabs of the paving composition measuring 50 x 18 x 8 cm. were prepared by compaction for 10 min. with a Proctor rammer whose stroke is 45 cm. in suitable molds. Samples measuring 4 x 4 x 8 cm. are obtained by cutting the slab. After being brought to thermal equilibrium at 18° C., the samples were compressed lengthwise with the aid of an "Instron" press at the rate of 5 cm./minute; the force is noted at the moment of rupture.

Table VI presents the results obtained with the various paving compositions.

TABLE VI

| Paving compositions | $T_1$ | $T_2$ | $T_3$ | I | II | III |
|---|---|---|---|---|---|---|
| Mixing temperature (in °C.) | 150 | 180 | 210 | 150 | 180 | 210 |
| Compressive strength (in bars) | 50 | 52 | 56 | 87 | 111 | 122 |

This table shows the increase in compressive strength furnished by the addition of hard asphalts in the coatings. The gain is maximum if mixing is permitted at a higher temperature than for the conventional paving compositions; this increase in temperature gives the conventional compositions only a low, even negligible gain.

EXAMPLE VI

This example relates to the effect of the introduction of hard asphalt powder on the compressive strength of composition test pieces, as a function of the test temperature.

Sample compositions without hard asphalts $T_4$, $T_5$, $T_6$, $T_5'$ and $T_5''$ were prepared; and compositions IV and V complying with the invention.

Such compositions were prepared as follows: a previously dried aggregate and previously dried filler were added to some binder, all these constituents being identical with what is described in Example V; hard asphalts or Orgon filler consisting of calcium carbonate are then added as the case may be. Mixing lasts for two minutes, the hard asphalts or Orgon filler are introduced after 1 minute of mixing for compositions IV, V $T_5$, $T_5'$ and $T_5''$.

Table VII shows the mixing temperatures and the formulation of the paving compositions in parts by weight.

TABLE VII

| Composition | Mixing temp. (° C.) | Aggregate plus sand filler | Binder (penetration) | Hard asphalts | Orgon filler | Void coefficient |
|---|---|---|---|---|---|---|
| IV | 190 | 100 | 6.5(90) | 1 | 0 | 0.74 |
| V | 190 | 100 | 6.5(90) | 2 | 0 | 0.80 |
| $T_4$ | 160 | 100 | 6.5(90) | 0 | 0 | 0.67 |
| $T_5$ | 160 | 100 | 6.5(90) | 0 | 4 | 0.78 |
| $T_6$ | 190 | 100 | 6.5(25) | 0 | 0 | 0.67 |
| $T_5'$ | 190 | 100 | 6.5(90) | 0 | 1 | 0.69 |
| $T_5''$ | 160 | 100 | 6.5(90) | 0 | 1 | 0.69 |

Slabs of the compositions were made measuring 50 x 18 x 8 cm. by compacting for 10 minutes with a Proctor rammer, having a stroke of 45 cm., in suitable molds.

Test pieces measuring 4 x 4 x 8 cm. were obtained by cutting the slab to size. After establishing thermal equilibrium at 18° C. these were compressed along their length by means of an "Instron" press at the speed of 5 cm. per minute; the force at the instant of rupture was noted.

Figure 5:
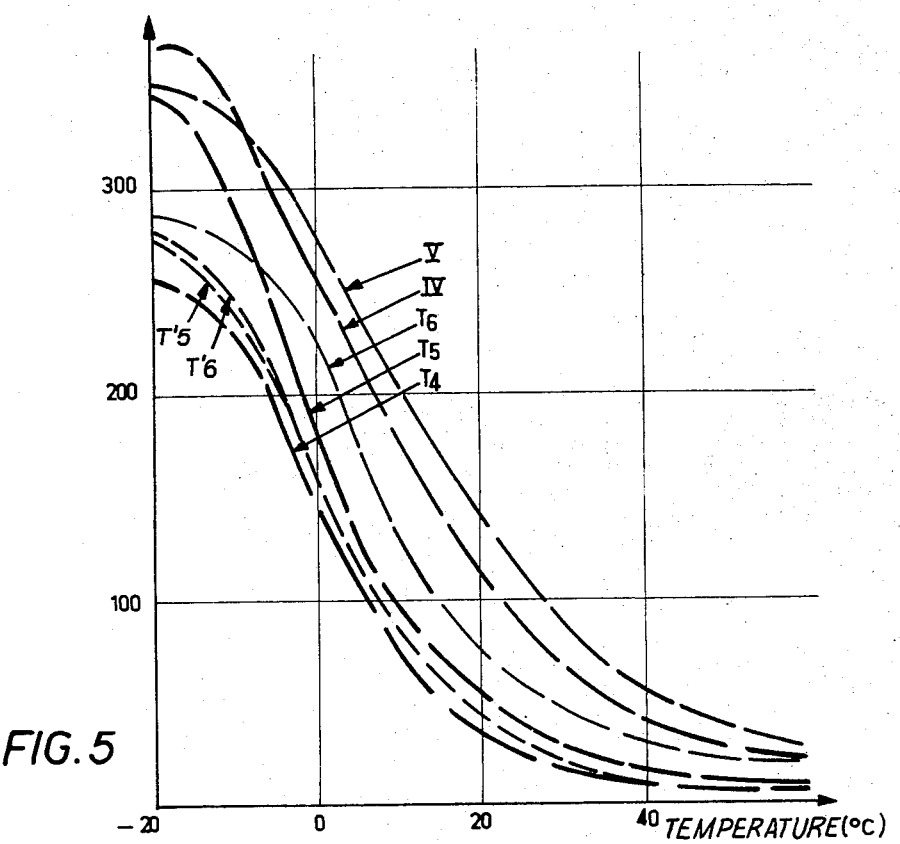
FIG. 5 is a graphic representation of the results of Example VI; it relates to the compressive strength measured as a function of temperature.

The test results on compositions IV, V, $T_4$, $T_5$, $T_6$, $T_5'$ and $T_5''$ are shown in FIG. 5.

These tests show that at any temperature, coatings IV and V according to the invention have a higher crushing strength than that of the control compositions. This is a surprising result: indeed, considering the hardness of the binder of composition $T_6$ and the hardness of the binder and hard asphalt mixtures of compositions IV and V, they are found to be closely related (in the case of $T_6$ and V) or even practically equal (in the case of $T_6$ and IV), as Table VIII shows. The comparison of composition IV, V and $T_5$ shows that the improvement is not due to a better filling of the voids.

TABLE VIII

| Compositions | Binder | Binder plus hard asphalts mixture |
|---|---|---|
| IV | 90 | 26 |
| V | 90 | 14 |
| $T_6$ | 25 | |

Hardness (penetration in tenths of mm.)

The invention consequently, by using a first binder and hard asphalts, allows for the preparation of bituminous paving compositions showing better mechanical properties than those of compositions prepared from a second binder of hardness equal to that of the mixture of the first binder and hard asphalts, all things otherwise being equal. Examples V and VI especially illustrate the progress achieved by optimization study of the various factors and particularly of the mixing temperature.

EXAMPLE VII

This example relates to the influence of the introduction of powdered hard asphalts on the LCPC crushing strength of composition test pieces and on the voids in the compositions as a function of the amount of binder.

Six series of bituminous paving compositions were produced, of which four were controls ($T_7$, $T_8$, $T_9$, and $T_{10}$) and two were in accordance with the invention (VI and VII).

The method and order of introduction of the components were identical with those described in Example V; however, the quantity and the penetration of the binder were variables. The aggregate and sand filler were identical with those used in Example V. Some Orgon filler can be added as a supplement.

The amount of binder, hard asphalts and Orgon filler were respectively $x$, $y$ and $z$ parts by weight per 100 parts by weight of the aggregate and sand filler mixture. The value $x$ varies from 5.5 to 8.5 in each series; the ratios $x/y$ and $x/z$ are constant in each series.

Table IX shows the mixing temperature and the formulations of these six series of paving compositions, as well as the void coefficients for 6.5 parts by weight of binder.

TABLE IX

| Composition | Mixing temp. (° C.) | Binder ($x$) penetration | Hard asphalts ($y$) | Orgon filler ($z$) | $x/y$ | $x/z$ | Void coefficient |
|---|---|---|---|---|---|---|---|
| VI | 190 | 90 | Yes | No | 3.25 | | 0.76 |
| VII | 190 | 90 | Yes | No | | 6.5 | 0.70 |
| $T_7$ | 160 | 90 | No | Yes | | 1.625 | 0.75 |
| $T_8$ | 190 | 25 | No | Yes | | 1.625 | 0.75 |
| $T_9$ | 160 | 90 | No | No | | | 0.64 |
| $T_{10}$ | 190 | 25 | No | No | | | 0.64 |

Test pieces were prepared from the six series of compositions for the purpose of measuring crushing strength at a temperature of 18° C. in air, according to the LCPC strength determination method.

Figure 6:
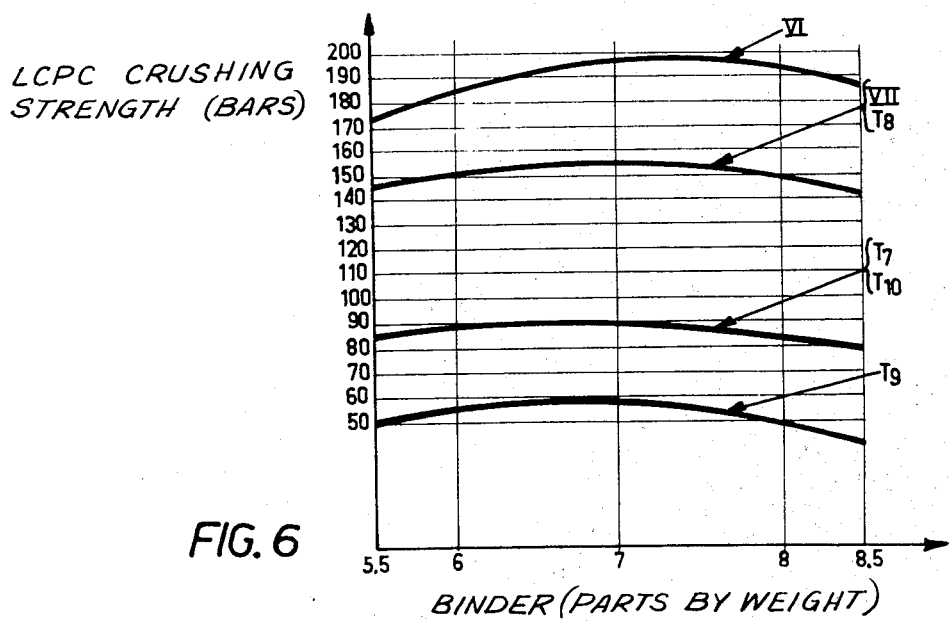
FIGS. 6 and 7 are graphic representations of the results obtained in Example VII; they relate respectively to the LCPC crushing strength and the volume of voids both measured as a function of the binder content of the paving composition.

FIG. 6 is made up of the curves representing these tests. These curves bring out the superiority of the paving compositions according to this invention as against the conventional compositions; they also emphasize that the optimum quantity of the binder is displaced by the addition of hard asphalts. This phenomenon is most pronounced for series VI.

Figure 7:
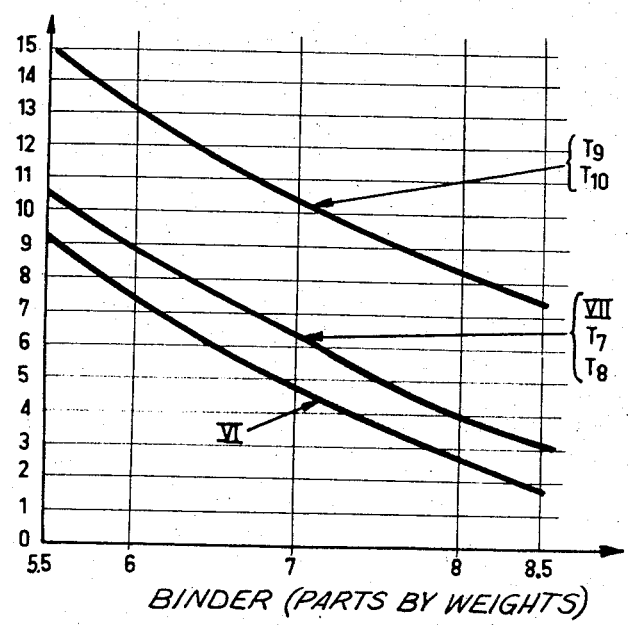

FIG. 7 assembles the curves representative of the voids in the six series of compositions. They bring out the fact that composition series VI is particularly "close" or compact and therefore has a higher resistance to atmospheric agents than the other series. The voids of a composition are expressed in parts by volume for 100 parts of volume of the composition as the ratio:

$$\text{voids} = 100 \times \frac{\text{theoretical density of the composition} - \text{real density of the composition}}{\text{real density of composition}}$$

The theoretical density is calculated from the density of each specie appearing in the composition. The real density is measured.

The knowledge of the voids of the compositions permits comparison of the efficiency of the mastics in the "tightness" (sealing) of the paving compositions.

Table X presents the results for compositions comprising 6.5 parts by weight (percent wt.) of binder per 100 parts by weight of mixture of aggregate and sand filler.

TABLE X

| Composition | Voids per 6.5% wt. of binder | Total mastic |
|---|---|---|
| $T_9$ | 11.5 | 23.4 |
| VII | 7.5 | 25.6 |
| VI | 6.2 | 27.6 |
| $T_7$ | 7.5 | 27.4 |

Parts by volume per 100 volumes of paving compositions

Table X brings out firstly that composition VI has the lowest voids and secondly that equal voids (compositions VII and $T_7$) are obtained by using a lower volume (approximately 5%) of total mastic in composition VII. These differences would be still greater if the added amount of hard asphalts were larger.

EXAMPLE VIII

This example relates to the resistance to rutting of the compositions according to the invention.

Asphalts paving compositions were produced according to the method described in Example VI: control compositions $T_{11}$ and $T_{12}$ and compositions complying with the invention, denoted by VIII and IX. Mixing was effected at a temperature of 190° C.

Table XI shows the formulations of the compositions expressed in parts by weight.

TABLE XI

| Composition | Binder (penetration) | Aggregate plus sand filler | Hard asphalts |
|---|---|---|---|
| VIII | 6.5 (90) | 100 | 1 |
| IX | 6.5 (90) | 100 | 2 |
| $T_{11}$ | 6.5 (25) | 100 | 0 |
| $T_{12}$ | 6.5 (90) | 100 | 0 |

Slabs of the compositions measuring 50 x 18 x 5 cm. were made by compacting for 10 minutes with a Proctor rammer having a stroke equal to 45 cm.

The test pieces obtained were subjected at room temperature of 50° C. (after establishing thermal equilibrium) to a cyclic passage over their larger surface by an inflated pneumatic tire at a pressure of 5 bars and under a load of 500 decanewtons. After 300,000 cycles, a profile of the rut thus formed is taken up.

Figure 8:
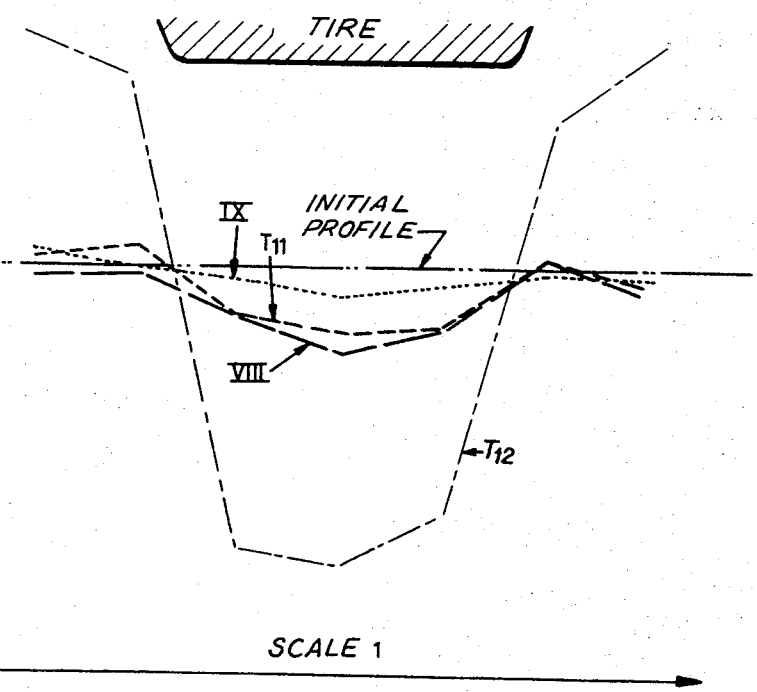
FIG. 8 is a graphic representation of rut profiles obtained in Example VIII.

FIG. 8 is a representation of these profiles. In this figure, the ordinate scale is 10 and the abscissa scale 1; a pneumatic tire is also shown transversely to give a scale of magnitude of the rut width. This figure confirms the superiority of compositions according to the invention, these being the ones whose final profile differs least from the original profile.

We claim:
1. A method for the preparation of a bituminous paving composition, whose components consist essentially of:
    (1) a dry mineral aggregate having a particle size of at least 80 microns,
    (2) a dry filler having a particle size of less than 80 microns,
    (3) a preheated solid bituminous binder separated from coal or petroleum and consisting essentially of asphaltenes, malthens and resins and
    (4) hard asphalts in the form of a non-preheated powder and containing at least 40% by weight of hard asphaltenes, the balance being composed of resins and no more than 30% by weight of carboids, the size of the hard asphalt particles not exceeding that of the finest portion of the aggregate, said method comprising mixing said components in any order at a temperature in the range of about 180° C. to 205° C.

2. A method according to claim 1, wherein the hard asphalts have a particle size approximating that of the filler.

3. A method according to claim 1, wherein the volume of non-preheated hard asphalt powder and the volume of filler are such that the value of the ratio of the volume of hard asphalts to the sum of the volumes of hard asphalts and filler approaches, and is preferably higher, than the value of that ratio which, within a specified temperature range for the specific binder and aggregate used, gives the bituminous paving composition maximum life in the rotative flexion test at steady load and frequency.

4. A bituminous paving composition prepared by mixing in any order at a temperature in the range of about 180° C. to 205° C. the following components:
    (1) a dry mineral aggregate having a particle size of at least 80 microns,
    (2) a dry filler having a particle size of less than 80 microns,
    (3) a preheated solid bituminous binder separated from coal or petroleum and consisting essentially of asphaltenes, malthenes and resins and
    (4) hard asphalts in the form of a non-preheated powder and containing at least 40% by weight of hard asphaltenes, the balance being composed of resins and no more than 30% by weight of carboids, the size of the hard asphalt particles not exceeding that of the finest portion of the aggregate.

5. A bituminous paving composition according to Claim 4 wherein the volume of non-preheated hard asphalt powder and the volume of filler are such that the value of the ratio of the volume of hard asphalts to the sum of the volumes of hard asphalts and filler approaches, and is preferably higher, than the value of that ratio which, within a specified temperature range for the specific binder and aggregate used, gives the bituminous paving composition maximum life in the rotative flexion test at steady load and frequency.

References Cited
UNITED STATES PATENTS

| | | | |
|---|---|---|---|
| 1,940,645 | 12/1933 | Fletcher | 94—23 |
| 2,220,670 | 11/1940 | Beckwith et al. | 94—23 |
| 2,349,445 | 5/1944 | McGrane | 106—280 |
| 2,349,446 | 5/1944 | McGrane | 106—280 |
| 2,686,166 | 8/1954 | Taylor | 260—28.5 |
| 2,921,919 | 1/1960 | Endres et al. | 260—28.5 |
| 3,074,807 | 1/1963 | Dorius et al. | 106—273 |
| 3,253,521 | 5/1966 | Endres | 94—20 |

JOSEPH L. SCHOFER, Primary Examiner

H. J. LILLING, Assistant Examiner

U.S. Cl. X.R.

106—284